Figure 1:
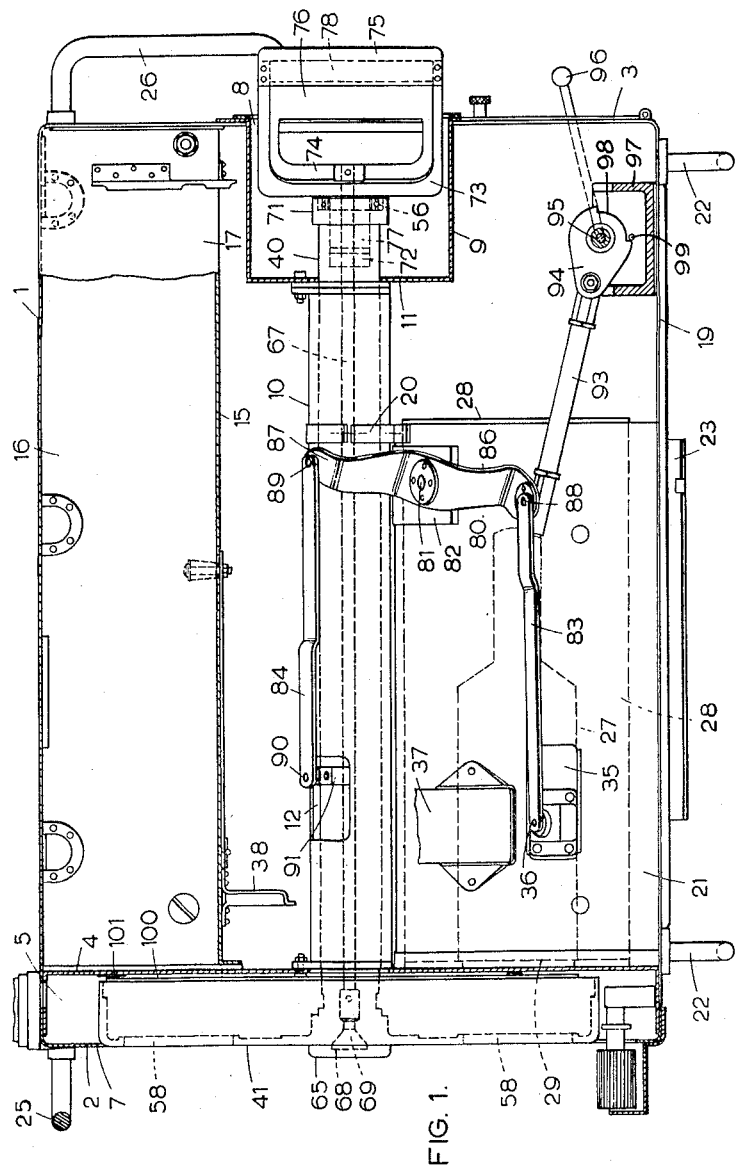

Nov. 15, 1960  H. E. HOLMAN  2,960,569

TELEVISION CAMERAS

Filed Nov. 23, 1955  3 Sheets-Sheet 1

Inventor
H. E. Holman
By: Glascock Downing & Seebold
Attys.

Nov. 15, 1960

H. E. HOLMAN 2,960,569

TELEVISION CAMERAS

Filed Nov. 23, 1955

3 Sheets-Sheet 2

Inventor
H. E. Holman
By: Gascock Downing &Seebold
Attys.

United States Patent Office 2,960,569
Patented Nov. 15, 1960

2,960,569

TELEVISION CAMERAS

Herbert Edward Holman, West Drayton, England, assignor to Electric & Musical Industries Limited, Hayes, England, a company of Great Britain Filed Nov. 23, 1955, Ser. No. 548,745

Claims priority, application Great Britain Dec. 1, 1954

13 Claims. (Cl. 178—7.2)

This invention relates to television cameras.

When a television camera is in use it is necessary to focus the image being televised onto the light sensitive surface of the pick-up tube of the camera and the usual method adopted is to mount the pick-up tube so that it can be moved along the axis of the optical lens to a position in which the image is brought into focus. It has also been proposed hitherto to use a fixed pick-up tube and to adjust the position of the optical lens relative thereto.

Both methods of focusing give rise to the disadvantage that the power required to adjust the moving system varies with the angle of elevation of the camera. When it is necessary to incline the camera to televise an object or scene above or below the camera, the mass of the moving system assists movement of the system in one sense and opposes movement in the opposite sense so that the force required to adjust the position of the moving system can vary considerably. This creates difficulties for the operator when a camera is provided with a manually operated focussing system and, in the case of a power driven focusing system, it necessitates the use of a large, relatively expensive, motor which is capable of supplying the maximum power required when a camera is elevated to an extreme position.

An object of the present invention is to provide an improved focusing system for a television camera such that the power required to operate the system is substantially uniform and substantially independent of the angle of elevation of the camera.

According to the invention a television camera is provided having focussing means comprising two discrete moving systems, one of said systems being arranged to carry the pick-up tube of the camera and the other being arranged to carry an optical lens for forming an image on the light sensitive surface of said tube, wherein means are provided which couple said systems together for simultaneous movement such that movement imparted to said systems to adjust the focus of the camera causes said tube and said lens to move simultaneously in opposite senses along the light path of the camera and the arrangement is such that said systems substantially counterbalance each other.

The moving systems may be coupled together in any suitable manner, e.g. mechanically or hydraulically, and if the systems are truly counterbalanced the force required to adjust the moving systems will be substantially constant for all positions of the camera and be made up substantially only of components of force required to overcome friction and the inertia of the moving parts. The forces of friction to be overcome may be kept small by providing suitable anti-friction bearings for the moving systems and in this manner the power required to operate the focusing system of a camera can be reduced to a minimum, substantially constant, value.

Usually a plurality of optical lenses of different focal lengths will be provided which may be mounted, in known manner, on a turret that can be rotated to bring a selected lens into operative relation with the pick-up tube and the turret may be mounted for axial displacement and arranged to form one of the two discrete moving systems.

Figure 2:
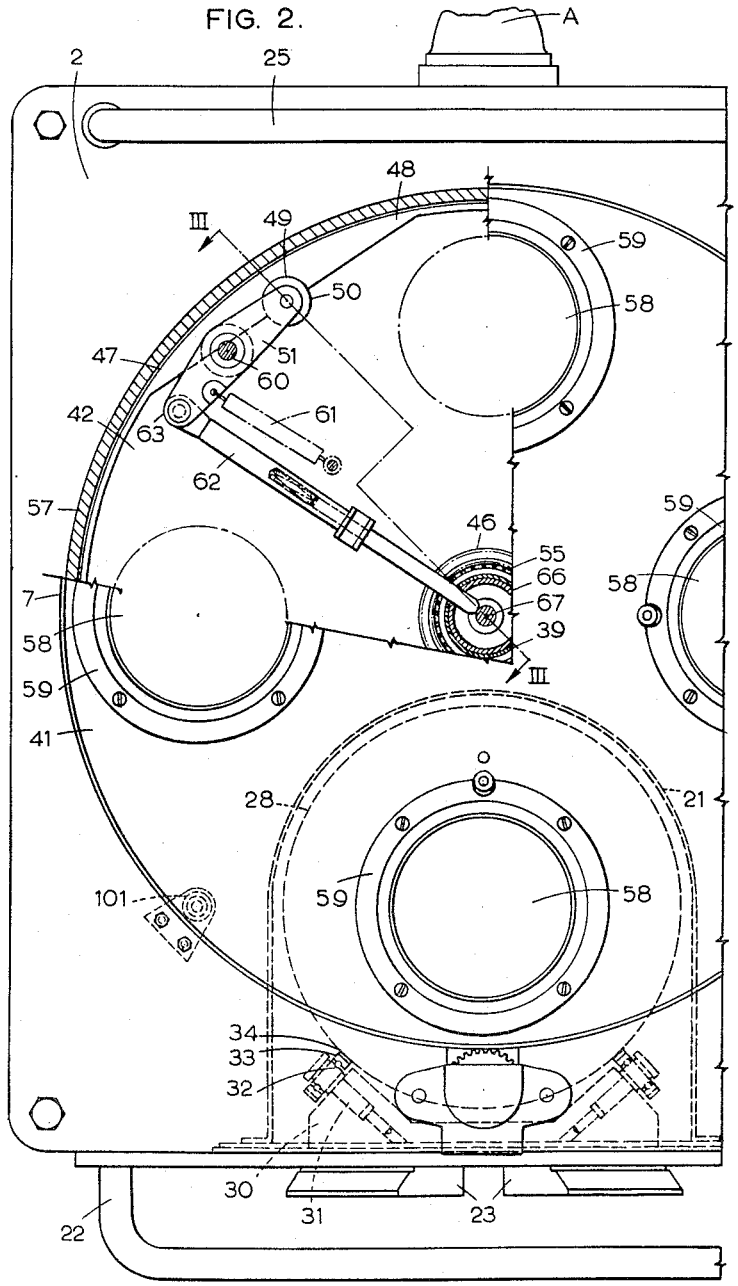
Figure 3:
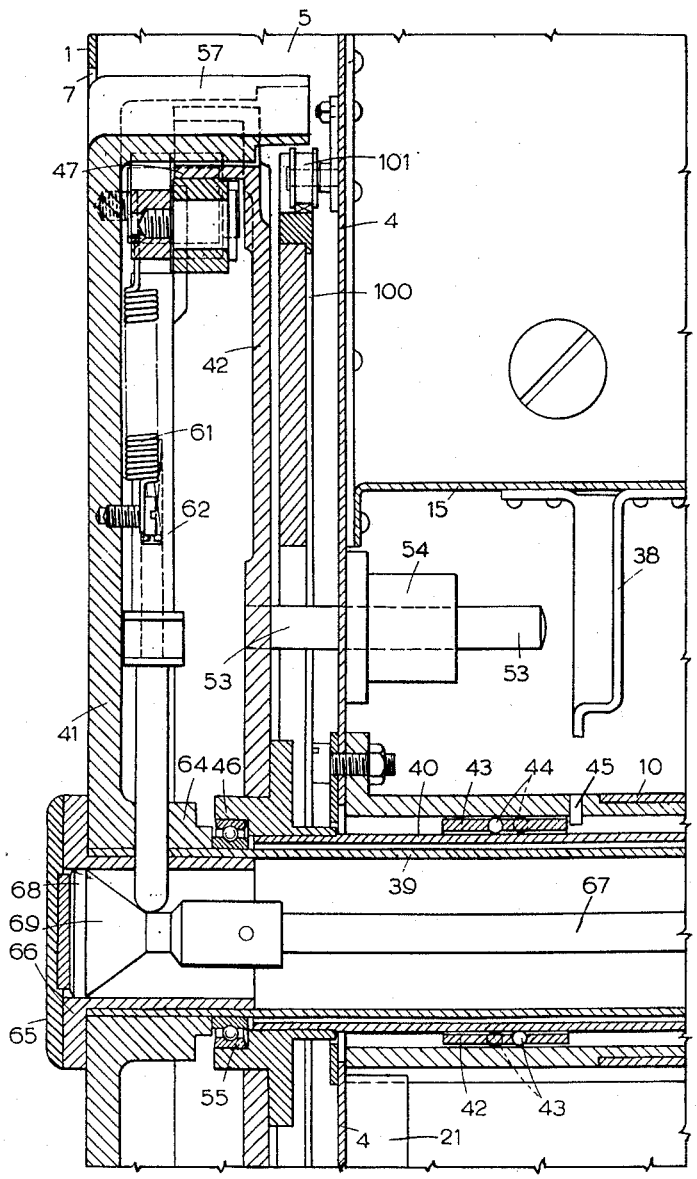

In order that the invention can be fully understood and readily carried into effect one embodiment thereof will now be described with reference to the accompanying drawings, in which:

Figure 1 shows in cross-section a side view of a television camera in accordance with the invention, Figure 2 shows on a larger scale and partly in cross section a front view of the camera, and Figure 3 shows on a still larger scale a detailed view in cross-section of a portion of the moving system of the camera which carries the optical lens or lenses of the focusing means.

The camera comprises a substantially rectangular outer casing 1 having substantially square front and back walls, 2, 3 and a partition 4 is disposed adjacent front wall 2, so as to form a front compartment 5 in casing 1. Front wall 2 is formed with a large circular aperture 7 therein and back wall 3 is formed with a smaller circular aperture 8 therein which is co-axial with aperture 7. A cup 9 is mounted in aperture 8 and forms a cylindrical recess in the back of casing 1. A tubular casing 10 is supported by partition 4 and cup 9, in co-axial relation to apertures 7 and 8, and casing 10 communicates with compartment 5 and the interior of cup 9 through apertures co-axial therewith which are formed in partition 4 and in the base 11 of cup 9. Tubular casing 10 is formed with a slot 12 therein, for a purpose to be referred to hereinafter. As shown in Figure 1, the upper portion of casing 1 is formed with a longitudinal recess therein for a view finder (not shown). The recess is defined by a base plate 15, side walls 16 and 17, partition 4 and back wall 3. Only the back end of wall 17 is shown in Figure 1.

The baseplate 19 of the camera carries an inverted U-shaped casing 21, which is disposed longitudinally of the camera, below tubular casing 10. A two part clamping ring 20 is mounted on casing 21 and forms an additional support for tubular casing 10. Baseplate 19 is mounted on supports 22 and carries a mounting plate 23 by means of which the camera can be mounted on a suitable pedestal and supported for universal movement such that it can be pointed in any desired direction. Front wall 2 of casing 1 carries a horizontal rail 25 and rear wall 3 carries a pair of symmetrically disposed vertical handles 26 of which one is visible in Figure 1.

The focussing means of the camera comprise two discrete moving systems, one of which is disposed inside the inverted U-shaped casing 21 and the other of which is supported by tubular casing 10. Said one system comprises a cylindrical housing 28 which carries the pick-up tube of the camera and, preferably, it is made of a high permeability material so as to form a magnetic shield round the tube. Housing 28 is mounted on two identical sets of rollers, one of which is shown in Figure 2 and comprises a member 30 on baseplate 19, which is bored to receive ends of shafts 31. Each shaft 31 supports the internal ball race 33 of a ball bearing roller having a tyre 34 thereon which is formed of brass or other suitable non-magnetic material so as to isolate magnetically housing 28 from the ball bearing. This set of rollers is disposed intermediate the front end and the longitudinal centre of casing 21 and an identical set of rollers (not shown) is disposed intermediate said centre and the back end of casing 21, such that housing 28 is supported by the rollers in parallel relation to tubular casing 10 and can be displaced axially towards and away from partition 4. The front end of housing 28 is formed with an aperture 29 therein and an aperture is formed in partition 4 in alignment with aperture 29, to permit light to pass through partition 4 into housing 28.

Housing 28 arranged to support the pick-up tube of the camera and ancillary apparatus, including focusing means and deflecting means (not shown) for the cathode ray beam of the tube. The position of the tube within housing 28 is indicated by the broken line 27 of Figure 1. The light sensitive surface of a pick-up tube mounted in housing 28 is framed by aperture 29 in the front end of housing 28. An aperture 35 is formed in casing 21 and housing 28 carries a stub shaft 36 which projects through aperture 35 and forms a means for coupling a driving member to housing 28. A further aperture is provided in casing 21 to which an air-duct 37 is connected. Duct 37, a portion only of which is shown, is connected to a rotary blower (not shown) that is adapted to be mounted on bracket 38, the blower being provided to blow a stream of cooling air through casing 21.

The other discrete moving system of the focusing means of the camera comprises a pair of co-axial tubular shafts 39 and 40 on which a lens carrying member or turret 41 and an indexing plate 42 for the turret are mounted, respectively.

Referring to Figure 3, shaft 40 is disposed in tubular casing 10 and supported for axial movement therein by two identical ball bearings, one of which is visible in the figure. Each bearing comprises a retaining sleeve 43 disposed round shaft 40, the sleeve having apertures of spherical form therein in which balls 44 are retained so that they project beyond both surfaces of sleeve 43 into engagement with bearing surfaces of shaft 40 and casing 10. Partition 4 and a stop 45 on casing 10 define the limits of axial movement of sleeve 43 in casing 10. The other ball bearing (not shown) is disposed adjacent the back end of casing 10. The front end of shaft 40 projects through partition 4 and carries a collar 46 on which indexing plate 42 is rigidly mounted. Plate 42 comprises a disc having a forwardly directed cyclindrical flange 47 thereon and the internal surface of flange 47 is formed with a number of segments 48 (see Figure 2) corresponding to the number of lens positions on turret 41. Each segment 48 contains a locating groove 49 for the roller 50 of a locking device 51, which will be referred to more fully hereinafter. Plate 42 carries a guide pin 53 disposed parallel to shaft 40 and pin 53 projects through an aperture in partition 4 into a bearing sleeve 54 mounted on the partition. Preferably sleeve 54 comprises a substantially frictionless bearing, such as a ball bearing. Pin 53 permits axial movement of plate 42 and shaft 40 while preventing angular movement thereof about the axis of shaft 40. Plate 42 is formed with an aperture therein in co-axial relation to aperture 29 in pick-up tube housing 28.

The lens carrying member or turret shaft 39 is supported in spaced co-axial relation with shaft 40 by two ball bearings 55 and 56. Bearing 55 is disposed in an annular recess in the front end of collar 46. Bearing 56, is disposed at the back ends of shafts 39 and 40, its position being shown in broken lines in Figure 1. Bearing 55 comprises an inner ball race mounted on shaft 39 and an outer ball race mounted on collar 46 of shaft 40 and the arrangement is such that they permit relative angular movement between shafts 39 and 40 and prevent relative axial movement therebetween. The front end of shaft 39 projects beyond shaft 40 and supports lens carrying member or turret 41 comprising a disc formed with a rearwardly directed cylindrical flange 57 thereon which surrounds the forwardly directed flange 47 on indexing plate 42. Turret 41 is formed with four symmetrically disposed circular apertures 58 (see Figure 2) therein and carries mounts 59 which, in known manner, serve to support discrete lens systems (not shown) on turret 41. The centres of apertures 58 lie on a circle concentric with turret 41 and, in the angular position of the turret shown in Figure 2, the lowermost aperture is in co-axial alignment with aperture 29 in pick-up tube housing 28 and light passing through a lens system carried by the mount surrounding said lowermost aperture will be directed onto the light sensitive surface of a pick-up tube disposed in housing 28. Turret 41 can be rotated relative to indexing plate 42 to move any selected aperture 58 into alignment with aperture 29 in casing 28 and thus into line with the light path of the camera and the locking device 51, referred to hereinbefore, is arranged to couple turret 41 positively to indexing plate 42 when the angular position of the turret is such that an aperture 58 therein is in alignment with said light path.

Referring to Figures 2 and 3, the locking device comprises a lever 51 mounted intermediate its ends on a stub shaft 60 carried by turret 41 and having a roller 50 which rides on the inner surface of flange 47 on plate 42. A spring 61 which is secured at one end to turret 41 and at the other end to lever 51, biasses roller 50 into engagement with flange 47 and into recess 49 in the flange. An actuating arm 62 is connected to end 63 of lever 50 and disposed radially relative to turret 41 and arranged to project through a radial aperture in the hub 64 of turret 41 and into the bore of shaft 39. The front end of shaft 39 is closed by a cap 65 attached to a flanged sleeve 66 which fits into shaft 39 and shaft 39 and sleeve 66 are formed with apertures therein in alignment with the aperture in hub 64, thereby to permit arm 62 to project into shaft 39 to approximately the centre of the bore in the shaft.

A control rod 67 for arm 62 is disposed in shaft 39 and is provided with a cylindrical end portion 68 which fits snugly into the bore of sleeve 66. Portion 68 is joined to rod 67 by a conical portion 69 that serves to displace arm 62 radially when rod 67 is moved axially away from cap 65. Outward radial movement of arm 62 rocks lever 51 clockwise (see Figure 1) about stub shaft 60, thereby causing lever 51 to uncouple turret 41 from plate 42 so that turret 41 can be rotated.

Referring to Figure 1 the back end of indexing plate carrying shaft 40 projects into cup 9 of casing 1 and carries a collar 71 containing an annular recess for ball bearing 56. The back end of turret shaft 39 (not visible in Figure 1) terminates substantially flush with the back end of shaft 40 and carries the inner ball race of bearing 56. The back end of control rod 67 projects beyond shaft 40 and is supported in shaft 39 by a bearing, the position of which is indicated in broken lines at 72. Co-axial handles 73 and 74 are mounted on the back ends of shaft 39 and rod 67, respectively, and provided with a common hand grip comprising two relatively movable parts 75 and 76. Handle 73 is provided with a bored shank 77 which fits onto rod 67 and into shaft 39 to which it is secured. Handle 74 fits into handle 73 and handgrip portion 76 thereof is slidably mounted in a groove 78 in handgrip portion 75 on handle 73.

Control arm 67 is held normally in the position in which it is shown in Figures 1 and 3, due to the action of spring 61 of the locking device which urges arm 62 into the position shown in Figure 3 in which it engages rod 67 at the apex of conical portion 69 and urges portion 68 against cap 65. Arm 62 is urged by spring 61 into the position in which it is shown in Figures 2 and 3 whenever the angular position of indexing plate 42 is such that roller 50 on locking lever 51 can engage a groove 49 in flange 47, i.e. when the lens turret 41 is coupled to plate 42 and thereby prevented from rotating about its axis. To release the coupling, handgrip 75, 76 is grasped and squeezed, thereby causing handle 74 and control rod 67 to move rearwardly and conical portion 69 of the rod to displace arm 62 radially outwardly so that lever 51 rotates and moves roller 50 out of groove 49. Thereafter hand grip 75, 76 can be rotated to cause angular displacement of turret 41 and as soon as roller 50 has been displaced out of alignment with a groove 49 the pressure on handgrip 75, 76 can be released to permit spring 61 to rotate lever 51 anticlockwise and cause roller 50 to again engage flange 47 on plate 42. Continued angular displacement of turret 41 will cause roller 50 to roll round flange 47 until it engages in another groove 49 in the flange and locks turret 41 against further angular movement. When roller 50 moves out onto the flat base of a segment 48 while approaching a groove 49 in said segment, it is displaced radially inwardly relative to turret 41 and loads spring 61, thereby increasing the resistance to rotary movement of the turret and affording an indication to the operator that the roller has reached a position in proximity to a locating groove 49.

In this embodiment of the invention, turret 41 has four lens supports spaced angularly 90° apart and plate 42 is provided with four segments 48 containing locating grooves 49 spaced 90° apart, such that turret 41 becomes locked to plate 42 in those positions in which it supports a lens aperture 58 in alignment with aperture 29 in pick-up tube housing 28.

The two discrete moving systems of the camera described hereinbefore, namely, the housing 28, which carries the pick-up tube and ancillary components, and shaft 40, which carries indexing plate 42 and also turret shaft 39, the locking device 51 and control rod 67, are mechanically coupled together for simultaneous rectilinear movement such that movement imparted thereto causes the pick-up tube and a lens supported by turret 41 in alignment with aperture 29 in housing 28, to move simultaneously in opposite senses along the light path of the camera.

For this purpose, a lever 80 (see Figure 1) is provided which is pivotally mounted, intermediate its ends, on a stub shaft 81 carried by a platform 82 mounted on casing 21 and lever 80 is connected by links 83 and 84 to housing 28 and shaft 40, respectively. Lever 80 comprises sections 86 and 87 which carry stub shafts 88 and 89, respectively, for links 83 and 84. Link 83 is coupled to stub shaft 36, referred to hereinbefore, which is carried by housing 28 and projects through slot 35 in casing 21. Link 84 is connected by a stub shaft 90 carried by a strap 91 mounted on shaft 40 in a position such that shaft 90 projects through slot 12, referred to hereinbefore, in tubular casing 10. Sections 86 and 87 are suitably curved in the manner shown, such that stub shafts 81, 88 and 89 can be disposed in parallel relation with the centres of rotation of lever 80 and links 88 and 89 lying in a common plane. The ratio of the lengths of sections 86 and 87 of link 80 is made substantially equal to the ratio of the weights of the two moving systems, the shorter arm being connected to the heavier system, whereby the two systems are substantially counterbalanced and gravity neither assists nor retards movement of the systems when the camera is inclined to the horizontal. Hence, the force required to move the systems for the purpose of adjusting the length of the light path between a lens supported by the turret in its operative position and the light sensitive surface of a pick-up tube in the camera, is substantially independent of the position of the camera and substantially constant.

Lever 80 is coupled by a connecting rod 93 to a crank 94 carried by a transverse shaft 95 supported from base 19 of the camera by a member 97. Shaft 95 projects through one side of casing 1 and an operating lever 96 is mounted on the projecting portion of the shaft. Preferably, locking means (not shown) will be provided for locking lever 96 in any set position such that handle 73 on shaft 40 cannot normally be used to cause axial displacement of shaft 40 for the purpose of focussing the camera. Crank 94, is formed with a circumferential groove 98 therein and a stop 99 carried by member 97 engages in groove 98 and limits angular displacement of crank 94. Crank 94 is shown in one limiting position, in Figure 1, such that the forward end of pick-up tube housing 28 lies substantially flush with partition 4 and the forward surface of turret 41 lies substantially flush with front wall 2 of casing 1. Clockwise movement of lever 96 from the position shown will rotate shaft 95 and crank 94 and cause rod 93 to move so as to draw link 83 and housing 28 away from the front of the camera. Simultaneous movement will also be transmitted to the turret 41 through lever 80, link 84 and shaft 40, such that turret 41 will move forwardly through aperture 7 in casing 1, thereby lengthening the light path between the pick-up tube of the camera and the operative lens thereof. Rotation of crank 94 produces a non-linear displacement of the focusing means of the camera and as shown in Figure 1, crank 94 is disposed in such relationship to connecting rod 93 that a fine adjustment of the focusing means is obtained when the length of said light path is short and a relatively coarser adjustment is obtained when the length of said path is increased and focusing is less critical.

A camera in accordance with the invention may be provided with a light filter, and in the present embodiment of the invention an adjustable light filter 100 is disposed between indexing plate 42 and partition 4 (see Figure 3). Filter 100 is mounted independently of the focusing means and is supported by rollers 101 carried by partition 4, such that it can be rotated to bring a desired section of the filter into alignment with the light path of the camera. Filter 100 will not be described in detail since it forms no part of the present invention.

Although the invention has been described with reference to a camera having a single pick-up tube it is also applicable to a camera provided with a plurality of pick-up tubes such as may be used, for example, for transmitting pictures in colours.

What I claim is:

1. In a tiltable television camera, a support for a pick-up tube, a carrier for means for optically forming an image on the light sensitive screen of a pick-up tube when mounted on said support, means mounting said support for movement along the light path of the camera, means mounting said carrier for movement along said light path and means coupling said support and said carrier together for simultaneous movement in opposite senses along said light path, said coupling means having the property that when the camera is tilted the force required to move one of said support and carrier against the action of gravity is supplied partly by the gravitational force of the other of said support and carrier.

2. Apparatus according to claim 1, wherein said housing and said carrier are connected to opposite ends of a lever pivoted intermediate its ends and means are provided for rotating said lever, thereby to move said housing and said shaft simultaneously in said opposite senses.

3. In a tiltable television camera, a support for a pick-up tube, a carrier for means for optically forming an image on the light sensitive screen of a pick-up tube when mounted on said support, a shaft supporting said carrier in said light path, means mounting said shaft for axial movement to displace said carrier along said light path and means coupling said support and said shaft together for simultaneous linear movement in opposite senses relative to said light path, said coupling means having the property that when the camera is tilted the force required to move one of said support and carrier against the action of gravity is supplied partly by the gravitational force of the other of said support and carrier.

4. In a tiltable television camera a support for a pick-up tube, a lens turret, means mounting said support for movement along the light path of the camera, means mounting said turret for rotation to different positions in which different lenses are disposed in said light path and for axial movement along said light path and means coupling said support and said turret together for simultaneous movement in opposite senses along said light path, said coupling means having the property that when the camera is tilted the force required to move one of said support and turret against the action of gravity is supplied partly by the gravitational force of the other of said support and turret.

5. In a tiltable television camera, a support for a pick-up tube, a shaft, a lens turret mounted on said shaft, means mounting said support for movement along the light path of the camera, means mounting said shaft for rotation to different positions in which different lenses are disposed in said light path and for axial movement parallel to said light path, means for positively locating said shaft in said different positions and means coupling said support and said shaft together for simultaneous movement in opposite senses relative to said light path, said coupling means having the property that when the camera is tilted the force required to move one of said support and turret against the action of gravity is supplied partly by the gravitational force of the other of said support and turret.

6. Apparatus in accordance with claim 5, wherein said locating means comprise an indexing plate surrounding said shaft, means connecting the plate to said shaft for axial movement therewith, means for preventing rotation of the plate with said shaft and means for releasably locking the plate and the lens turret together in said different positions of said shaft.

7. Apparatus in accordance with claim 6 and comprising a tubular shaft containing said shaft and on which said indexing plate is mounted, means supporting the tubular shaft for axial movement and means coupling the tubular shaft to said shaft for axial movement therewith.

8. In a television camera a support for a pick-up tube, means mounting said support for movement along the light path of the camera, co-axial inner and outer shafts, means mounting said outer shaft for axial movement parallel to the light path of the camera, means mounting said inner shaft for rotation within said outer shaft and for axial movement therewith, a lens turret mounted on said inner shaft, an indexing plate for said turret mounted on said outer shaft, means for preventing rotation of said indexing plate, means for releasably locking said turret and said indexing plate together in predetermined angular positions of said turret and means for moving said support and said co-axial shafts simultaneously in opposite senses relative to the light path of the camera.

9. Apparatus in accordance with claim 8, wherein said indexing plate is formed with grooves therein in positions corresponding to said predetermined positions of the lens turret and a locking device is mounted on said turret and engages said plate and moves into a groove in said plate in said predetermined positions of said turret.

10. Apparatus in accordance with claim 8 wherein said inner shaft comprises a hollow shaft and means disposed within said hollow shaft for releasing said means for locking said turret and said indexing plate together.

11. In a television camera, a support for a pick-up tube, means mounting said support for movement along the light path of the camera, co-axial inner and outer shafts, a cylindrical member enclosing said co-axial shafts, a plurality of ball bearings supporting said outer shaft within said cylindrical member for axial movement parallel to said light path, means mounting said inner shaft for rotation within said outer shaft and for axial movement therewith, a lens turret mounted on said inner shaft, an indexing plate for said turret mounted on said outer shaft, means for preventing rotation of said indexing plate, means for releasably locking said turret and said indexing plate together in predetermined angular positions of said turret and means for moving said support and said co-axial shafts simultaneously in opposite senses relative to the light path of the camera.

12. In a television camera, a support for a pick-up tube, means mounting said support for movement along the light path of the camera, co-axial tubular inner and outer shafts, means mounting said outer shaft for axial movement parallel to the light path of the camera, means mounting said inner shaft for rotation within said outer shaft and for axial movement therewith, a lens turret mounted on said inner shaft, an indexing plate for said turret mounted on said outer shaft, means for preventing rotation of said indexing plate, means for releasably locking said turret and said indexing plate together in predetermined angular positions of said turret, a control rod for releasing said locking means disposed in said inner shaft and means for moving said support and said co-axial shafts simultaneously in opposite senses relative to said light path.

13. Apparatus in accordance with claim 12 and having a handle on the control rod, a further handle on the inner shaft and a common handgrip comprising one part mounted on said handle and another part mounted on said further handle means mounting said parts for relative displacement to actuate the control rod and said handle is rotatable to rotate the inner shaft to different angular positions.

References Cited in the file of this patent

UNITED STATES PATENTS

| | | |
|---|---|---|
| 2,355,136 | Bedford | Aug. 8, 1944 |
| 2,572,729 | Jackson | Oct. 23, 1951 |
| 2,697,971 | Evans | Dec. 28, 1954 |
| 2,727,431 | Blatherwick | Dec. 20, 1955 |

FOREIGN PATENTS

| | | |
|---|---|---|
| F11515 | Germany | Dec. 29, 1955 |